June 24, 1952 M. A. LALANDE 2,601,302

TWO-WAY WIRE TELEPHONE REPEATER CIRCUIT

Filed Dec. 15, 1945 2 SHEETS—SHEET 1

INVENTOR.
Marc A. Lalande
BY Edward W. Plummer
ATTORNEYS

June 24, 1952 M. A. LALANDE 2,601,302

TWO-WAY WIRE TELEPHONE REPEATER CIRCUIT

Filed Dec. 15, 1945 2 SHEETS—SHEET 2

INVENTOR.
Marc A. Lalande
BY
Edward W. Pinney
ATTORNEYS

Patented June 24, 1952 2,601,302

UNITED STATES PATENT OFFICE 2,601,302

TWO-WAY WIRE TELEPHONE REPEATER CIRCUIT

Marc A. Lalande, Paris, France, assignor to International Standard Electric Corporation, New York, N. Y., a corporation of Delaware Application December 15, 1945, Serial No. 635,333
In France May 2, 1941

Section 1, Public Law 690, August 8, 1946
Patent expires May 2, 1961

11 Claims. (Cl. 179—16)

This invention relates to communication systems, particularly to two-way wire telephone repeater circuits for two-way amplification, and has for an object to provide a circuit arrangement in which the repeater is normally ineffective during the idle or non-talking period.

It has been the practice heretofore, as far as applicant is aware, to maintain telephone repeaters in a continuously energized state during both the talking and non-talking periods, thereby causing current drain which becomes appreciable as the number of repeater circuits increases. Furthermore, the life of the vacuum tubes and related apparatus of the repeater circuit is substantially reduced by this continuous energization.

It is, therefore, another object of the invention to provide an improved repeater circuit that is adapted to be connected to the transmission system only during the talking period, while the transmission system is continuously available for signaling purposes during the non-talking period.

It is still another object of the invention to provide a more efficient and economical arrangement for the utilization of repeaters in transmission circuits.

It is a further object of the invention to provide a specially arranged repeater circuit whereby calls may be transmitted from one end to the other end of a transmission line to which the repeater is connected without the necessity of using call re-transmitters.

It is a still further object of the invention to provide a repeater circuit that is of small size and weight and which consumes comparatively little current.

According to a feature of the present invention, advantages are secured over the prior arrangements by normally interconnecting the transmission lines at the repeater point through back contacts of a switching relay to provide a continuous metallic circuit for the transmission of call and release signals thereover, front contacts of the relay being connected to the repeater circuit, which is, therefore, normally disconnected from the transmission line and which is de-energized during the idle period. The repeater circuit is first energized in response to a call signal impressed over the lines, then connected to the lines upon termination of the call signal, and finally disconnected therefrom upon initiation of a release signal, thereby consuming current only during the interval of time between the call signal and the release signal.

According to another feature of the invention, the vacuum tubes that are utilized in the repeater are provided with direct heating cathodes that require slight heating current. These tubes are of the twin-grid type, in which one grid is brought to a positive potential with respect to the filament and functions as an electron-catching electrode. The other grid functions in a manner similar to the usual control grid.

According to another feature of the invention, the source of energy for the electron-catching electrode and plate electrode of the repeater tubes is supplied by a vibrator operating at a frequency of a few hundred cycles per second, which vibrator is followed by a rectifier and filter, the vibrator being energized from the same source of direct current that feeds the vacuum tube filaments.

According to another feature of the invention, in the event of a breakdown of a vacuum tube or other element of the repeater, for example of the battery or vibrator, means are provided for automatically disconnecting the repeater and for re-establishing the metallic connection between the two lines.

According to another feature of the invention, means are provided for checking the amplification and operation of the repeater by using the vibrator as the source of measuring current.

These and other features of the invention will be more fully described in the following specification taken in connection with the accompanying drawings, in which.

Figure 1:
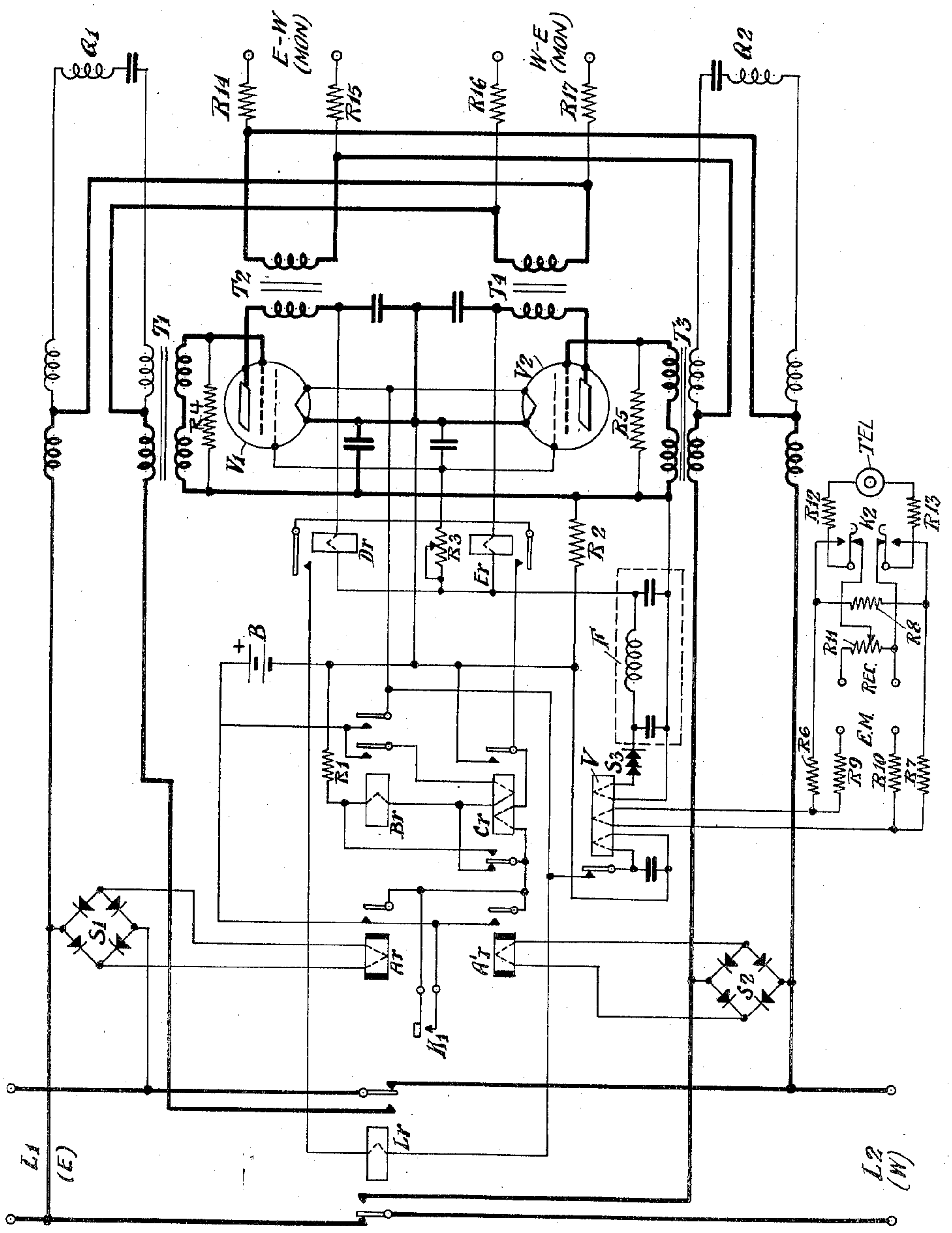
Fig. 1 is a schematic view of one embodiment of a repeater circuit.

Referring now to the drawings, particularly to Fig. 1, there is schematically shown a telephone repeater circuit to which is adapted to be connected a pair of communication channels or transmission lines L1 and L2, which may be termed East (E) and West (W) lines, respectively. The repeater circuit may be located in what is called a repeater office or repeater station (not shown), which may be attended by personnel or unattended, a plurality of transmission lines having appearances thereat for through or terminal use. The transmission lines, such as L1 and L2, are connected to associated offices (not shown) in the usual manner. As is well known in telephone practice, communication occurs over the two wire lines L1 and L2 in both directions and the repeater circuit is, therefore, provided with two single stage amplifiers, one for amplifying speech in each direction.

The amplifiers of the repeater circuit comprise twin-grid vacuum tubes V1 and V2, which are rendered ineffective during the idle period, that is, while the transmission lines L1 and L2 are in a non-talking condition. The filaments of the tubes V1 and V2 are of low current consumption, for example, consuming about 80 milliamperes at a potential of four volts. The first grid of each tube, that is the grid nearest the filament in the drawings, is brought to a positive potential of about 10 volts with respect to the positive end of the filament, while each plate is brought to a positive potential of about 30 to 50 volts, for example. The second grid functions as a control grid, being biased at —2 volts, for example, with respect to the negative end of the filament. Accordingly, the first grid plays the part of an electron-catcher and makes it possible to obtain a slope of more than one milliampere per volt. It is, of course, understood that the above values are given only by way of example, being by no means limitative, and may be modified as desired without departing from the scope of the invention.

A source of direct current energy, such as a battery B of suitable potential, is adapted to supply the filament, as well as the plate, current for vacuum tubes V1 and V2, the filament circuits being connected directly to the battery B. Since the plate circuits require a higher potential, as indicated hereinbefore, a voltage booster, such as a vibrator V, is connected to the battery for increasing the voltage to the required level, the output thereof being rectified by rectifiers S3 and the pulsating direct current being filtered by a filter F of any suitable configuration, such as the $\pi$ section shown.

When no conversation is taking place, the two lines L1 and L2 are shown connected together through back contacts of a switching relay Lr, while the repeater circuit is connected through front contacts of this relay and is, accordingly, disconnected from the transmission lines L1 and L2. It is, therefore, apparent that lines L1 and L2 are metallically connected together at the repeater station, the other ends of these lines being connected to associated offices, one of which may be termed an originating or calling office and the other a final or called office. The repeater, in addition to being disconnected from the transmission lines L1 and L2, is also normally de-energized, that is, the direct current battery B is disconnected from the filaments of tubes V1 and V2, as well as from the relatively high frequency vibrator V during the idle period. It is thus seen that while the repeater is idle, it is consuming no current, thereby producing substantial savings in current drain.

When conversation is to be held over lines L1 and L2, switching relay Lr is actuated, as will be described hereinafter, to remove the metallic connections, namely, the back contacts of switching relay Lr, and to connect the repeater through the front contacts of switching relay Lr, so that the repeater is serially interposed between lines L1 and L2. As shown in Fig. 1, voice frequency currents impressed over line L1 from, say the calling office, are connected through right front contact of switching relay Lr and hybrid coil or bridge transformer T1 to vacuum tube V1, where they are amplified and transmitted through output transformer T2 and thence continued through hybrid coil or bridge transformer T3 to line L2 and the called office via left front contact of switching relay Lr. Similarly, the voice frequency currents impressed over line L2 from the called office are connected through the left front contact of switching relay Lr and bridge transformer T3 to vacuum tube V2, which amplifies the currents and transmits the amplified frequencies through output transformer T4, bridge transformer T1, and thence through right front contact of switching relay Lr to line L1 and the calling office. For monitoring conversations over the transmission lines L1 and L2, monitoring posts MON are shown connected to the terminals of the secondary windings of output transformers T2 and T4 via resistances R14, R15 and R16, R17, respectively.

The invention will be most readily understood from a description of the operation thereof.

Assuming that a telephone call is to be made between a calling office (not shown) connected to line L1 and a called office (not shown) connected to line L2 and that the distance between the two stations is such that a repeater circuit is required to amplify the conversations, the call is initiated by impressing a low frequency signaling or ringing current of usual type over line L1 from the calling office, which current is transmitted through back contacts of switching relay Lr and over line L2 to the called office. A portion of this ringing current is rectified by a rectifier bridge S1 disposed across line L1, the rectified current being connected, as shown, through windings of a control relay Ar, which is energized. In operating, relay Ar at its front contact closes a circuit for relay Br. This circuit may be traced from the positive terminal of battery B through front contact of relay Ar, back contact of relay Cr, winding of relay Br, and thence through resistance R1 to negative terminal of battery B. Relay Br operates and at its outer right front contact closes a direct current supply circuit for the filaments of vacuum tubes V1 and V2. This circuit may be traced from the positive terminal of battery B through the outer right front contact of relay Br, through the filaments of vacuum tubes V1 and V2, which are in parallel, and thence back to the negative terminal of battery B.

A circuit is also closed by relay Br for operating vibrator V, which circuit may be traced from positive terminal of battery B, through outer right front contact of relay Br, back contact and left winding of vibrator V, and thence back to the negative terminal of battery B. The output circuit of vibrator V, which supplies the plate circuits of vacuum tubes V1 and V2, may be traced from the plates of vacuum tubes V1 and V2, through output transformers T2 and T4, respectively, and in parallel paths through relays Dr and Er, after which the paths converge and continue through filter F, rectifiers S3, extreme right winding of vibrator V, and thence back through filter F and resistance R2 to the filament windings of the vacuum tubes V1 and V2. As soon as the filaments of tubes V1 and V2 have become sufficiently heated to furnish plate current, the output current from vibrator V energizes relays Dr and Er through the hereinbefore-traced circuit and applies a voltage through resistance R3 to the first grid, termed herein for convenience, catching grid electrodes. Resistance R3 is variable in order to permit adjustment in gain of the vacuum tubes V1 and V2.

Relay Br, at its inner right front contact, also closes a circuit for relay Cr, which circuit may be traced from positive terminal of battery B through this contact, right winding of relay Cr, winding of relay Br and thence through resistance R1 to negative terminal of battery B. This relay, however, cannot operate because of the short circuit across its right winding, as presented through the front contact of relay Ar and the back contact of relay Cr.

Upon operation of relays Dr and Er, a circuit is closed for relay Lr which may be traced as follows: from positive terminal of battery B through outer right front contact of relay Br, winding of relay Lr, front contacts of relays Dr and Er, left winding and back contact of relay Cr, winding of relay Br, and thence through resistance R1 to minus terminal of battery B. Relay Lr, however, cannot operate in view of the series impedance introduced by the windings of relays Br and Cr and resistance R1.

Upon termination of the ringing current, relay Ar releases and upon retraction of its front contact breaks the hereinbefore described short circuit across the right winding of relay Cr, which, accordingly, is energized over the above-traced circuit. Relay Cr, in operating, at its right front contact closes an energizing circuit for relay Lr, which may be traced from positive terminal of battery B through outer right front contact of relay Br, winding of relay Lr, front contacts of relays Dr and Er, and thence through right front contact of relay Cr to negative terminal of battery B. At its left front contact, relay Cr provides a locking circuit which may be traced from positive battery through outer right front contact of relay Br, winding of relay Lr, front contacts of relays Dr and Er, left winding and left front contact of relay Cr, and thence through resistance R1 to negative terminal of battery B.

Relay Lr, in operating, at its back contacts disconnects transmission line L1 from transmision line L2; at its left front contact connects one conductor of transmission line L2 to the repeater circuit through bridge transformer T3, the other conductor of line L2 being connected directly to the transformer T3; and at its right front contact connects one conductor of line L1 to the repeater through bridge transformer T1, the other conductor of line L1 being directly connected to the transformer T1. The repeater, including vacuum tubes V1 and V2, bridge transformers T1 and T3, and output transformers T2 and T4, is, accordingly, inserted between the lines L1 and L2 while in an operative condition. The network winding of bridge transformers T1 and T3 are connected to the usual balancing networks Q1 and Q2, respectively, each consisting of a resistance and condenser of suitable value. The networks may be replaced by more complex balancing networks, if required, in accordance with well-known telephone practice. Conversation now takes place between the calling and called offices.

Upon conclusion of the conversation, a release signal of any suitable type, such as ringing current, is sent from one end of line L1, say the calling office, and, when this signal reaches the repeater station, relay Ar re-operates through the rectifier bridge S1 in a manner similar to that when the calling signal was first impressed over the line. However, should the release signal come from the called party over line L2, relay A'r will be operated through the rectifier bridge S2 connected across line L2. Upon operation of relay Ar, or relay A'r, the front contact thereof connects a short circuit across the winding of relay Br and the right winding of relay Cr. This short circuit may be traced from the positive terminal of battery B, through front contact of relay Ar, or relay A'r, and thence through left front contact of relay Cr and resistance R1 to negative terminal of battery B. Relay Cr, though, is maintained operated by its left winding, the holding circuit therefor being now traced from positive terminal of battery B, through front contact of relay Ar, or relay A'r, and thence through left winding and right front contact of relay Cr to negative terminal of battery B. Relay Br releases and opens the battery circuit to the filaments, vibrator V, and relay Lr. Vacuum tubes V1 and V2 are, therefore, de-energized. Relay Lr also releases and re-establishes the original metallic connection between lines L1 and L2 through its back contacts and thus permits transmission of the release signal to the other end of the circuit, that is, to the called office. Relay Lr, in retracting its front contacts, also disconnects the repeater circuit from the transmission lines L1 and L2. Upon termination of the release signal, relay Ar, or relay A'r, as the case may be, releases and retraction of its front contact opens the above-traced circuit for relay Cr, which releases.

A testing circuit for the repeater is shown at the bottom of Fig. 1. By means of cords and jacks (not shown), the East and West inputs of the repeater are respectively connected to the testing circuit transmission terminals EM and reception terminals REC, or vice versa, according to the direction of transmission to be tested. During the testing operation, the repeater is manually activated by means of a switch K1, the contact of which functions similarly to the front contact of relay Ar, or relay A'r. Vacuum tubes V1 and V2 are therefore energized in a manner similar to that described hereinbefore. The tone emitted by the vibrator may be monitored, as shown, by means of a third winding of the vibrator that is connected via resistances R9 and R10 to transmission terminals EM, and also via resistances R6 and R7 to contacts of a change-over switch K2. It is possible through switch K2 to monitor the tone emitted by vibrator V either via the repeater and potentiometer R11 connected to the reception terminals REC of the testing circuit, that is, with switch K2 in the position shown, or at the terminals of resistance R8 in the other position of switch K2. The potentiometer R11 is adjusted so as to obtain the same tone in the telephone receiver TEL for the two positions of switch K2. Potentiometer R11 is also provided with a dial (not shown), which is graduated for gain. Resistances R12 and R13 are large with respect to resistances R8 and R11 in order to minimize the shunt effect introduced by the telephone receiver TEL. Upon termination of the tests, the repeater is rendered ineffective by opening the switch K1.

Figure 2:
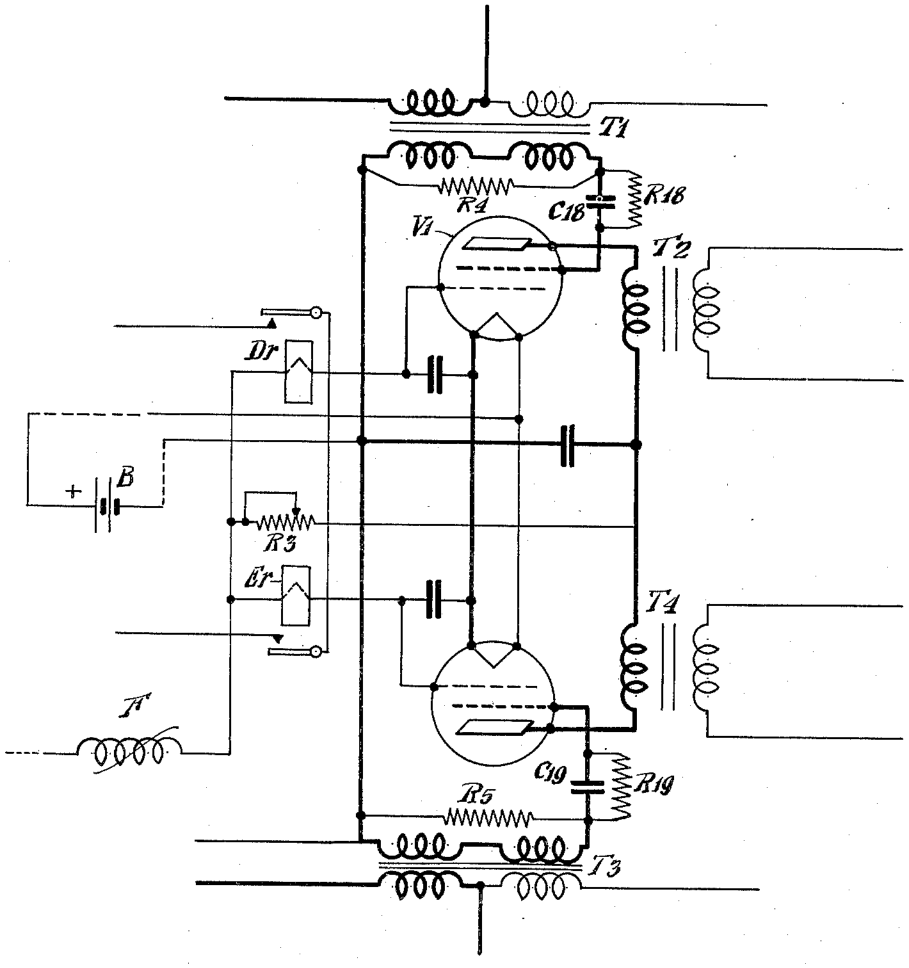
Fig. 2 is a modification of the amplifier shown in Fig. 1.

Referring now to the modification shown in Fig. 2, relays Dr and Er may be located, as shown, in the connections to the electron-catching grids and the gain adjustment resistance R3 may be inserted in the feed connection of the plates of the tubes V1 and V2, when, owing to operating conditions, the current of the electron-catching grids is greater than the current of the plates. Resistance R2 is omitted in this modification and the bias of the control grids is produced by a system of condensers shunted by resistances C18–R18 and C19–R19, respectively, that effect the self-polarization of the control grids by the voice frequency or conversation currents. This arrangement makes it possible to take advantage of the maximum amplification of the tubes when the voltages of the incoming signals are very low, although it causes a certain amount of distortion which, however, interferes very little with the conversation.

If either of the vacuum tubes V1 or V2 should become defective, if battery B should be run down, if vibrator V should stop operating or, in a more general way, if there is failure of the plate current (Fig. 1) or the screen current (Fig. 2) of either tube, one of the relays Dr or Er, or both of them, will release and open the operating circuit of relay Lr, which will, in turn, release and re-establish at its back contacts the metallic connection between the two lines L1 and L2.

Thus, it will be apparent that among others, the objects of the invention, as especially hereinbefore mentioned, are achieved. Obviously, numerous modifications and adaptations of the circuits shown might be resorted to without departing from the spirit of the invention, as defined by the claims. For example, the vibrator may be replaced by a high voltage source, such as a dry battery, that is in permanent connection but only delivers energy as long as the battery is being fed. Under this modification, it would, of course, be necessary to add an auxiliary vibrator controlled by a switch for supplying the testing circuit when required.

What is claimed is:

1. A telephone system comprising a pair of transmission channels, a repeater in a normally inactive state, means responsive to a signal, received over one of said channels and normally used for completing the connection for automatically activating said repeater, means responsive to the termination of said signal for interconnecting said channels and repeater, and means responsive to a second signal over one of said channels for automatically disconnecting said repeater therefrom and for rendering said repeater inactive.

2. In a communication system, a pair of transmission lines, a repeater adapted for interconnecting said lines during the talking period only, said repeater being de-energized during the non-talking period, means for metallically interconnecting said lines during the non-talking period, means responsive to a signal, received over said lines and normally used for completing the connection, for energizing said repeater, and means responsive to the termination of said signal for rendering said metallic interconnecting means ineffective and for connecting said repeater to the lines.

3. In a telephone system, a pair of transmission lines, a telephone repeater adapted to be connected to said lines during the talking period only, said repeater being de-energized during the non-talking period, switching means for metallically interconnecting said lines during the non-talking period, means responsive to a signal, received over said lines and normally used for completing the connection, for energizing said repeater, means responsive to the termination of said signal for causing said switching means to connect said repeater to the lines, said responsive means also being responsive to a second signal over said lines for disconnecting said repeater from said lines and for restoring said switching means.

4. In a telephone system, an office, incoming and outgoing lines terminating therein, switching means for metallically interconnecting said incoming and outgoing lines, means for repeating messages, said repeating means being de-energized and ineffective while said lines are metallically interconnected, and means responsive to ringing current over said lines for energizing said repeating means and for causing said switching means to interconnect said repeating means with said lines, said responsive means also being responsive to a second projection of ringing current for automatically disconnecting said repeating means from said line and for de-energizing said repeating means.

5. In a telephone system, a repeater station, an incoming and an outgoing line terminating thereat, a switching relay for metallically interconnecting said incoming and outgoing lines, a repeater for amplifying voice currents over said lines adapted to be connected thereto, said repeater being normally de-energized during the non-talking period, means including a control relay responsive to a call signal over said lines for energizing said repeater, and means responsive to the termination of said signal for causing said switching relay to connect said repeater with said lines, said control relay also being responsive to a release signal for disconnecting said repeater from said lines and for metallically interconnecting the lines.

6. In a telephone system, a repeater station, an incoming and an outgoing line terminating thereat, a switching relay for metallically interconnecting said incoming and outgoing lines, a repeater for amplifying voice currents over said lines adapted to be connected thereto, said repeater being normally de-energized during the non-talking period, means including a control relay responsive to a predetermined signal over said lines for energizing said repeater and for interconnecting said repeater with said lines, and means including a relay effective in the event of a fault in said repeater for disconnecting said repeater from said lines and for metallically interconnecting the lines.

7. A telephone system comprising a pair of transmission channels, a repeater in a normally inactive state and comprising thermionic amplifying tubes having filamentary heaters and anodes, means responsive to a signal, received over one of said channels and normally used for completing the connection for automatically energizing said heaters and anodes, and means responsive to the termination of said signal for automatically interconnecting said channels and repeater.

8. A telephone system, as defined in claim 7, in which means is provided responsive to a second signal over one of said channels for automatically disconnecting said repeater from said channels and for de-energizing the filamentary heaters and anodes.

9. A telephone system, as defined in claim 7 in which the means for energizing the filamentary heaters and anodes of the thermionic tubes comprises a source of heating current, a relay having front contacts connecting said source in series with said heaters, and energizing means for said anodes also controlled by the front contacts of said relay, and the means for interconnecting the channels and repeater comprises a second relay under control of said first relay.

10. A telephone system, as defined in claim 9 in which a safety relay is provided in an operating circuit on each tube in the repeater so as to be operated when the tube is energized and the circuit for the third relay extends through front contacts of said safety relays, whereby the operation of a safety relay will release said third relay and disconnect said repeater from said channels.

11. A telephone system, as defined in claim 7, in which a source of potential for the anodes of the thermionic tubes comprises a vibrator, and a source of direct current potential, the means for energizing the filamentary heaters and the anodes including means for connecting said source of direct current potential to said vibrator.

MARC A. LALANDE.

REFERENCES CITED

The following references are of record in the file of this patent:

UNITED STATES PATENTS

| Number | Name | Date |
|---|---|---|
| 1,586,308 | Homrighous | May 25, 1926 |
| 1,763,013 | Skillman | June 10, 1930 |
| 1,829,803 | Korn | Nov. 3, 1931 |
| 1,881,642 | Jones et al. | Oct. 11, 1932 |
| 1,889,005 | Smith | Nov. 29, 1932 |
| 1,986,514 | Mitchell | Jan. 1, 1935 |
| 2,020,875 | Burton | Nov. 12, 1935 |
| 2,141,476 | Lomax | Dec. 27, 1938 |
| 2,152,184 | Gostin et al. | Mar. 28, 1935 |
| 2,191,398 | Penn | Feb. 20, 1940 |